(12) United States Patent
Zheng

(10) Patent No.: US 10,098,279 B2
(45) Date of Patent: Oct. 16, 2018

(54) RAISING AND LOWERING MECHANISM FOR A MOWER DECK OF A LAWN MOWER

(71) Applicant: YANGZHOU WEIBANG GARDEN MACHINE COMPANY LIMITED, Yangzhou, Jiangsu (CN)

(72) Inventor: Xuzhong Zheng, Jiangsu (CN)

(73) Assignee: YANGZHOU WEIBANG GARDEN MACHINE COMPANY LIMITED, Yangzhou, Jiangsu (CN)

(*) Notice: Subject to any disclaimer, the term of this patent is extended or adjusted under 35 U.S.C. 154(b) by 158 days.

(21) Appl. No.: 15/401,272

(22) Filed: Jan. 9, 2017

(65) Prior Publication Data

US 2017/0196167 A1 Jul. 13, 2017

(30) Foreign Application Priority Data

Jan. 13, 2016 (CN) .................... 2016 2 0029088 U

(51) Int. Cl.
*A01D 34/00* (2006.01)
*A01D 34/74* (2006.01)
*A01D 34/82* (2006.01)
*A01D 101/00* (2006.01)

(52) U.S. Cl.
CPC .......... *A01D 34/74* (2013.01); *A01D 34/824* (2013.01); *A01D 2101/00* (2013.01)

(58) Field of Classification Search
CPC ... A01D 34/74; A01D 34/824; A01D 2101/00
USPC ...... 56/14.9, 15.6, 17.1, 208, 320.1, DIG. 9, 56/DIG. 22
See application file for complete search history.

(56) References Cited

U.S. PATENT DOCUMENTS

| | | | | |
|---|---|---|---|---|
| 3,357,715 A | * | 12/1967 | Plamper ................. | A01D 34/74 280/43.13 |
| 3,611,682 A | * | 10/1971 | Isaacson et al. ....... | A01D 34/64 56/14.9 |
| 3,706,186 A | * | 12/1972 | Hurlburt ................ | A01D 34/74 56/15.8 |
| 4,869,057 A | * | 9/1989 | Siegrist ................. | A01D 34/64 56/15.9 |
| 5,351,467 A | * | 10/1994 | Trefz ..................... | A01D 34/74 56/14.9 |
| 6,293,077 B1 | * | 9/2001 | Plas ....................... | A01D 34/64 56/17.1 |
| 6,584,756 B2 | * | 7/2003 | Buss ...................... | A01D 34/64 56/15.6 |

(Continued)

*Primary Examiner* — Thomas B Will
*Assistant Examiner* — Mai T Nguyen
(74) *Attorney, Agent, or Firm* — Hudak, Shunk & Farine Co., LPA

(57) ABSTRACT

A mower deck suspended stably from a lawn mower frame by a four link frame of a front hanger and four link frame of a rear hanger. The height of the mower is adjusted when a handle is pushed forward to rotate a rotatable axle in a clockwise direction, which causes a driving lever to rotate in a clockwise direction. A fine adjustment screw pushes a swing arm to rotate rearward, which forces a bridging swing arm to rotate in a clockwise direction via a second link. The bridging swing arm forces the first link to swing upward which forces the rear end of the rear hanger to swing upward, thereby raising the mower deck. When the handle is pulled rearward, the mower deck will be lowered.

11 Claims, 5 Drawing Sheets

(56) References Cited

U.S. PATENT DOCUMENTS

| | | | | |
|---|---|---|---|---|
| 6,658,831 | B2* | 12/2003 | Velke | A01D 34/64 56/14.7 |
| 7,318,311 | B2* | 1/2008 | Wright | A01D 34/74 56/17.1 |
| 7,600,363 | B2* | 10/2009 | Porter | A01D 34/64 56/17.1 |
| 2007/0169456 | A1* | 7/2007 | Komorida | A01D 34/74 56/17.1 |
| 2013/0074467 | A1* | 3/2013 | Zwieg | A01D 34/64 56/17.1 |
| 2014/0260162 | A1* | 9/2014 | Lancaster | A01D 34/74 56/17.1 |
| 2015/0107212 | A1 | 4/2015 | Iida et al. | |

\* cited by examiner

RAISING AND LOWERING MECHANISM FOR A MOWER DECK OF A LAWN MOWER

FIELD OF THE INVENTION

The present invention relates to a lawn mower. More specifically, the present invention relates to a raising and lowering mechanism for a mower deck of a lawn mower.

TECHNICAL BACKGROUND OF THE INVENTION

Lawn mower is a garden machine which is specially used for mowing lawns. Typically, it comprises a frame, a mower deck, an engine, a driving mechanism, wheels, blades, steering means as well as other control components. High speed blades are provided within the mower deck, and a grass discharge opening is typically provided in a side wall of the mower deck, and the grass discharge opening is provided with a cover thereon. At the bottom of the mower deck, mower deck supporting wheels are generally mounted. The mower deck moves along with the frame and the running wheels, and the height of the mower deck determines the height of mowing, i.e., only the grass higher than the blades will be cut. The mower deck of a conventional lawn mower will be suspended from the frame via a chain, and the mowing height may be varied by adjusting the position of a height limit pin. The efficiency of such a structure in adjusting the height of the mower deck is low, and the mower deck tends to waggle when the lawn mower is running or changing speed. Thus, the mower deck as a whole is not sufficiently stable, which would affect the flatness of mowing.

SUMMARY OF THE INVENTION

It is an objective of the present invention to address the technical problems of the prior art, and provide a raising and lowering mechanism for a mower deck of a lawn mower. By using the raising and lowering mechanism of the present invention, the mower deck can be suspended stably from the lawn mower frame, and the height of the mower deck can be adjusted quickly and conveniently if required.

The raising and lowering mechanism for a mower deck of a lawn mower of the present invention comprises a frame and a mower deck hanging from the frame, the raising and lowering mechanism further comprises a front hanger and a rear hanger; the front hanger and the rear hanger are, independently, a four link frame, with a front end of the front hanger and a front end of the rear hanger being hinged, independently, to the frame of the lawn mower, and a lower portion of a rear end of the front hanger and a lower portion of a rear end of the rear hanger being hinged, independently, to a top portion of the mower deck; a first link is hinged to a middle portion of a rear link of the four link frame of the rear hanger, and an upper end of the first link is linked to a lower end of a bridging swing arm, with a middle portion of the bridging swing arm being hinged to the frame of the lawn mower via a spindle; an upper end of the bridging swing arm is hinged to a rear end of a second link, and a front end of the second link is hinged to an upper end of a swing arm, with an lower end of the swing arm being connected to a rotatable axle and able to rotate with respect to the rotatable axle; one end of the rotatable axle is fixedly connected with a driving lever, with an upper end of the driving lever being in screw connection with a fine adjustment screw; an end of the fine adjustment screw opposite a head thereof extends rearward and against a middle portion of the swing arm; the other end of the rotatable axle is connected with a handle which is operable to drive the rotatable axle to rotate.

As compared with prior art, the present invention can achieve the following beneficial effects: the mower deck is hanged under the front hanger and the rear hanger, and when the handle is pushed forward, the rotatable axle rotates in the clockwise direction, which causes the driving lever to rotate in the clockwise direction, then the end of the fine adjustment screw opposite a head thereof pushes the upper end of the swing arm to rotate rearward, and the swing arm forces the bridging swing arm to rotate in the clockwise direction via the second link; the bridging swing arm then forces the first link to swing upward, and the first link forces the rear end of the rear hanger to swing upward, thereby raising the mower deck. In contrast, when the handle is pulled rearward, the mower deck 16 will be lowered. In the present invention, the height of the mower deck can be fine adjusted by manually rotating the fine adjustment screw to move the screw back and forth; the position of the end of the fine adjustment screw opposite a head thereof will determine the position limit to which the upper end of the swing arm can swing forward, and in turn determine the mowing height of the mower deck; the rearward movement of the swing arm will not be limited; when the ground surface is not flat and a little hillock is present, upon contact of a support wheel with the little hillock, the mower deck as a whole can be lifted, and avoid collision with the little hillock, thereby avoiding damage of the lawn and impact on the mechanical structure due to "dig the ground".

In a preferred embodiment of the present invention, an upper end of the handle is extended outside of a slot at a top of a handle adjuster frame, and at one side of the slot is provided with a plurality of locking slots in which the handle can be locked. The handle is able to swing forward and backward in the slot to adjust the height of the mower deck, and when the mower deck is adjusted to a desirable height, the handle can be swung to, and locked in a respective locking slot such that the height of the mower deck can be maintained.

In a preferred embodiment of the present invention, an lower end of the handle is connected, preferably welded, with a handle sleeve tube, and a central axis of the handle sleeve tube is substantially perpendicular to a central axis of the rotatable axle; within the handle sleeve tube, a handle axle is inserted, and two ends of the handle axle are fixedly connected, respectively, to upper ends of two brackets, and the lower ends of the brackets are connected to the rotatable axle. Rotation of the handle sleeve tube with respect to the handle axle will drive the handle to swing to the left or the right so that the handle can enter, or withdraw from, the locking slots freely; swing back and forth of the handle will drive the rotatable axle to rotate via the handle sleeve tube and the brackets connected to the rotate axle, such that the height of the mower deck can be adjusted.

In a preferred embodiment of the present invention, onto the handle axle, a torsion spring is mounted, wherein the torsion spring functions to push the handle to a bottom of a locking slot. The tension of the torsion spring forces the handle to be locked reliably in the locking slot, thereby avoiding release of the handle from the locking slot.

In a preferred embodiment of the present invention, an end of the rotatable axle near the handle is supported within an axle hole in a vertical wall of the handle adjuster frame.

In a preferred embodiment of the present invention, a side wall of the swing arm is connected with a swing arm stop plate, and the end of the fine adjustment screw opposite a head thereof sits against the swing arm stop plate.

In a preferred embodiment of the present invention, a holding portion at an upper end of the handle 11 is provided with a handle cover.

Figure 1:
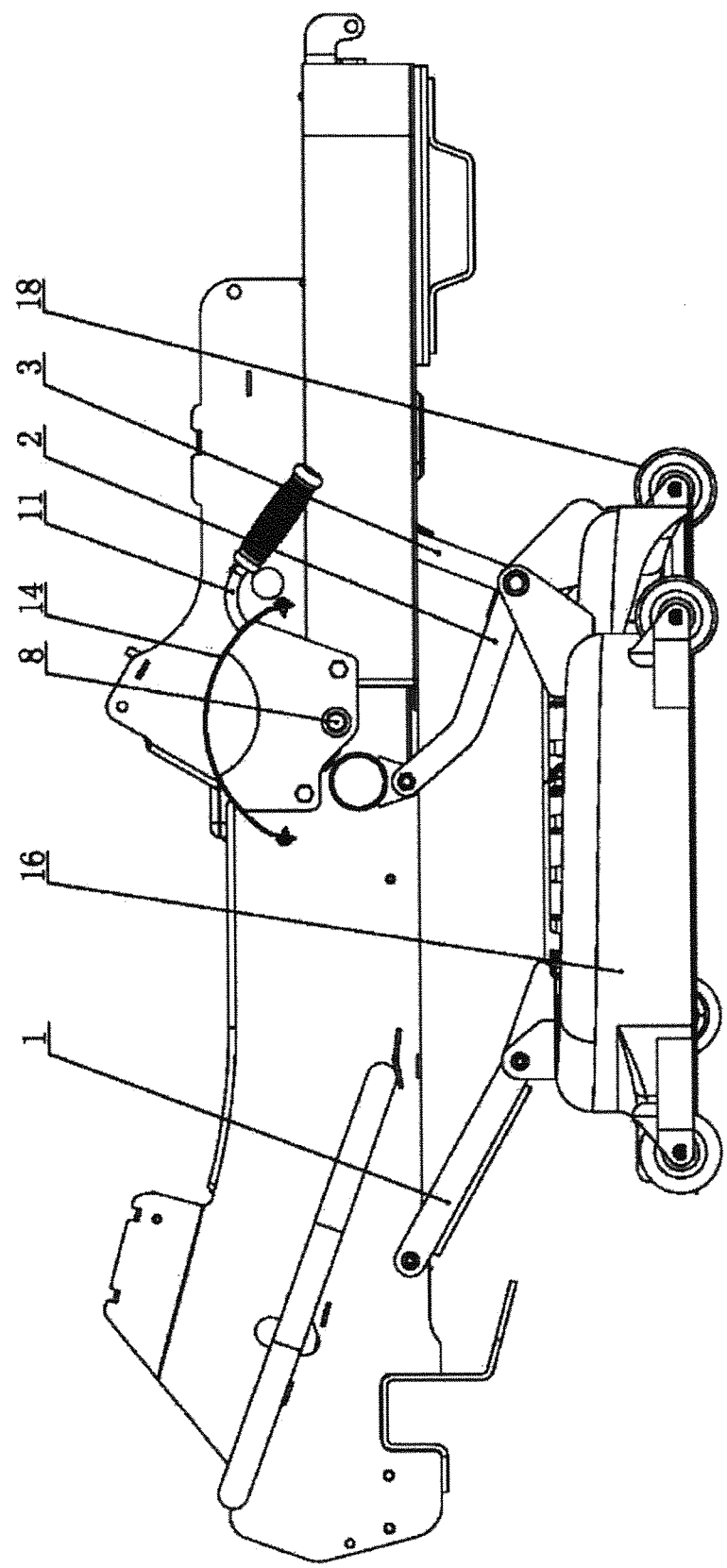
FIG. 1 is a schematic front view of the raising and lowering mechanism for the mower deck of a lawn mower of the present invention.

In the Figures: 1—front hanger; 2—rear hanger; 3—first link; 4—bridging swing arm; 5—spindle; 6—second link; 7—swing arm; 7a—swing arm stop plate; 8—rotatable axle; 8a—bracket; 9—driving lever; 10—fine adjustment screw; 11—handle; 11a—handle sleeve tube; 11b—handle cover; 12—handle axle; 13—torsion spring; 14—handle adjuster frame; 14a—slot; 14b—locking slot; 15—adjuster cover; 16—mower deck; 17—grass discharge opening cover; 18—mower deck supporting wheel.

DETAILED DESCRIPTION OF THE INVENTION

The present invention will be further described by referring to the accompanying drawings. It should be understood that the embodiments illustrated in the drawings are for description of the invention only and shall not be construed as any limitation to the present invention. The scope of the invention would rather be defined by the appended claims.

It should be understood that the accompanying drawings are merely used to illustrate the present invention, and not necessarily drawn in scale.

It should also be understood that the directional terms such as "above", "under", "left", "right", "front", "rear", "bottom", "top", "upper", "lower" or the like that may be used herein are merely for the ease of describing the present invention, and they should not be construed as limitations to the present invention in any way.

For brevity, reference numbers are not provided for all the parts, components or features shown in some of the figures. Thus, a cross reference to all of the drawings should be made when reading the detailed description below to obtain a clear and complete understanding of the present invention.

Figure 2:
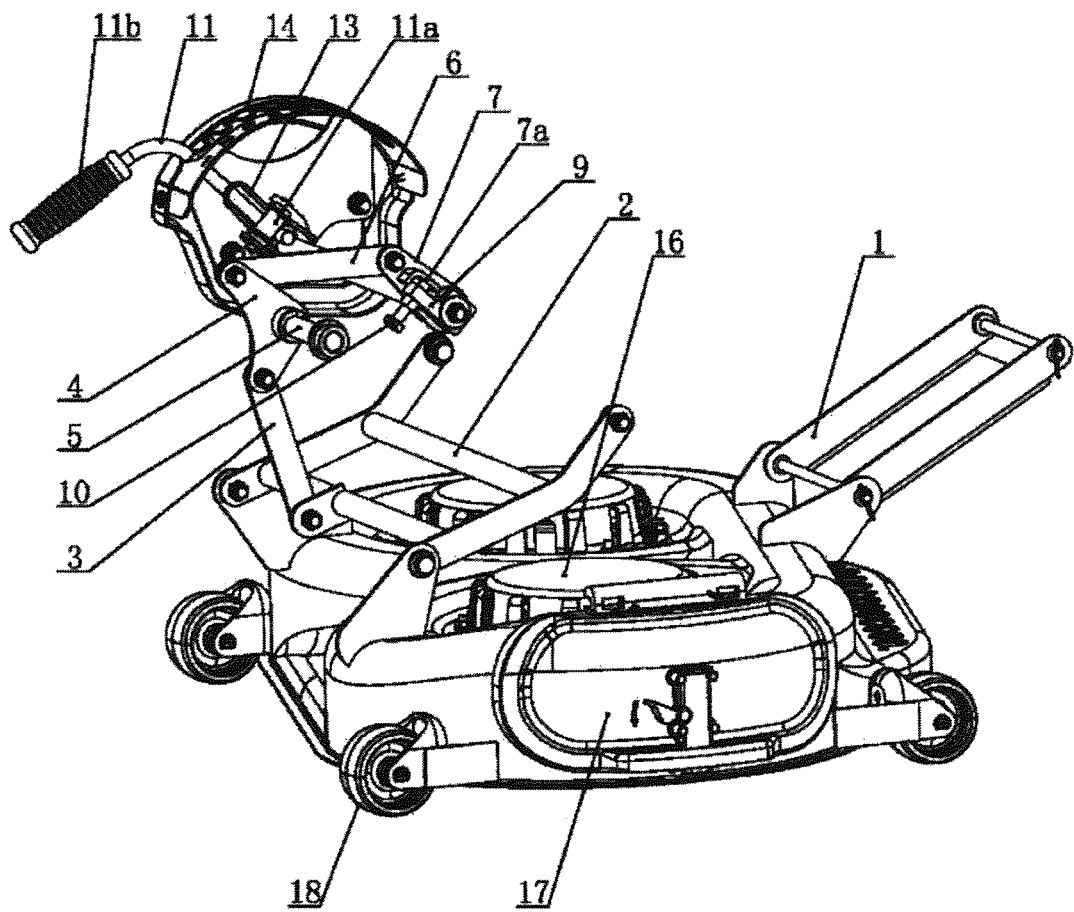
FIG. 2 is a schematic perspective view of the raising and lowering mechanism for the mower deck of a lawn mower of the present invention.
Figure 3:
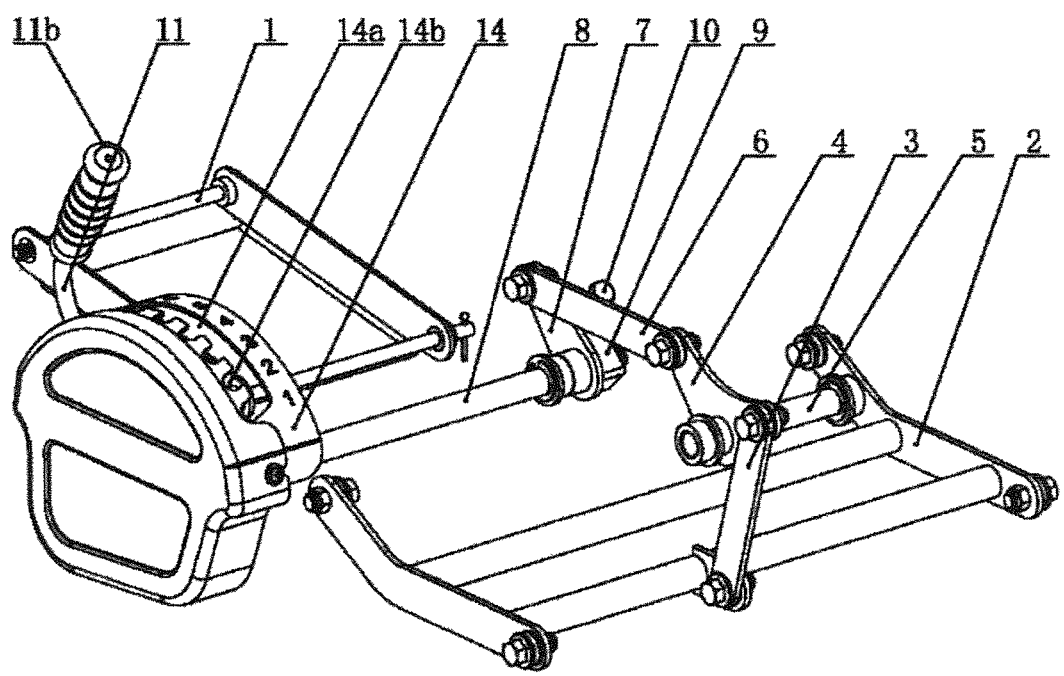
FIG. 3 is a first schematic perspective view of the rear hanger mechanism of FIG. 2.
Figure 4:
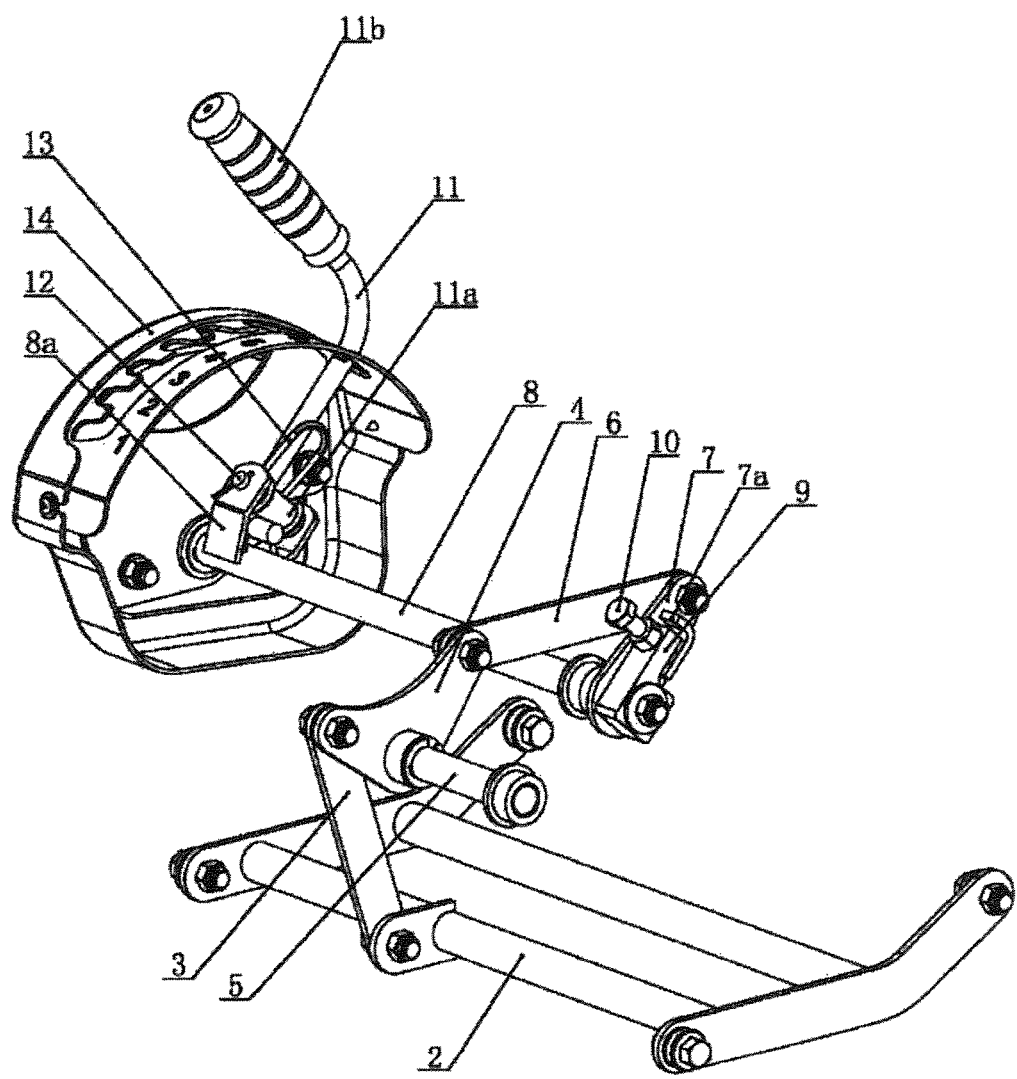
FIG. 4 is a second schematic perspective view of the rear hanger mechanism of FIG. 2.
Figure 5:
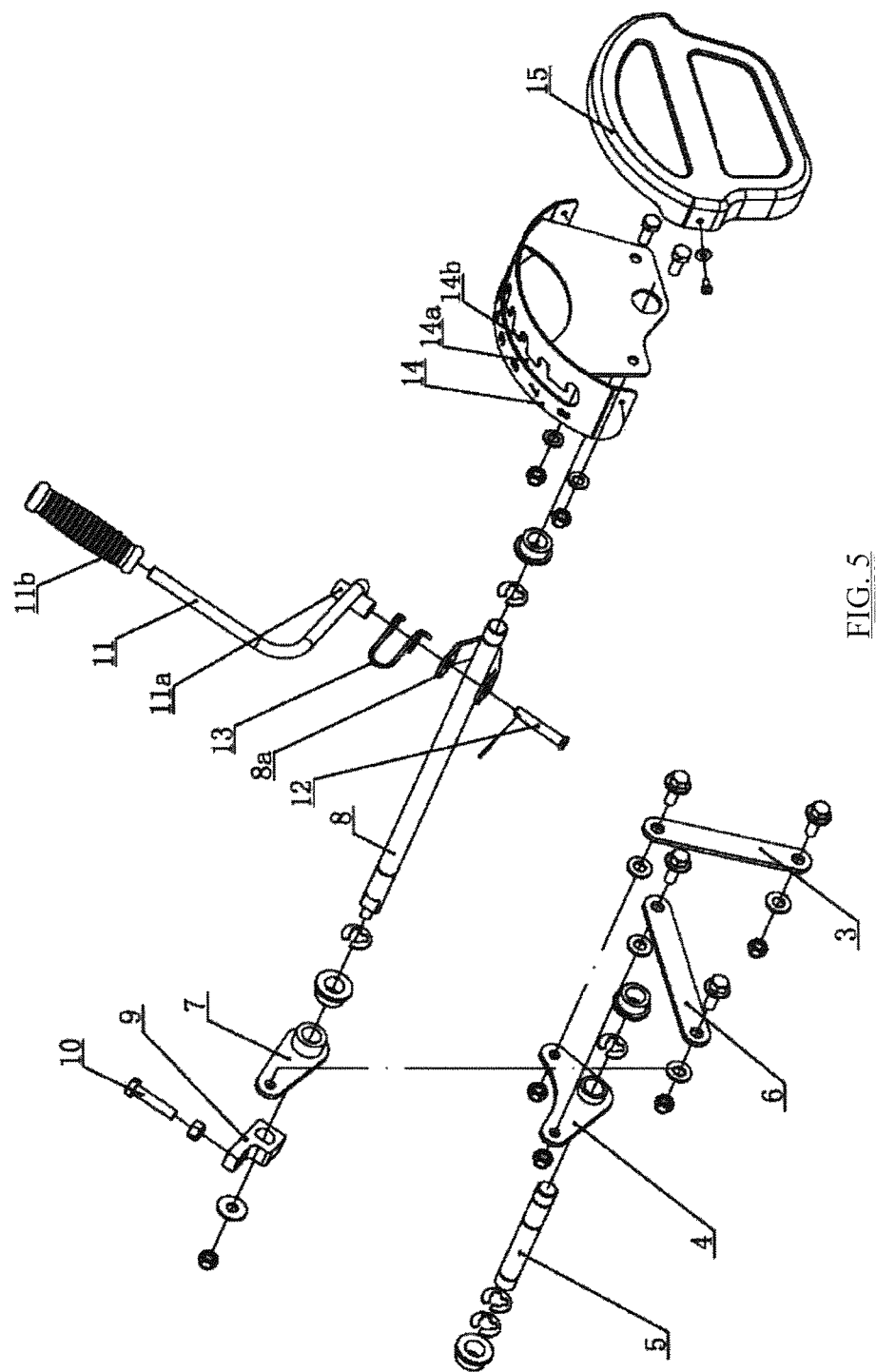
FIG. 5 is a schematic exploded perspective view of FIG. 3.

As shown in FIG. 1 to FIG. 5, the raising and lowering mechanism for the mower deck of a lawn mower comprises a frame and a front hanger 1 and a rear hanger 2 for hanging the mower deck 16. A high speed blade is provided within the mower deck 16, and in a side wall of the mower deck 16, a grass discharge opening is provided, with a cover 17 being arranged to cover the grass discharge opening. At the bottom of the mower deck 16, mower deck supporting wheels 18 are mounted thereon. The front hanger 1 and the rear hanger 2 are, independently, a four link frame, with a front end of the front hanger 1 and a front end of the rear hanger 2 being hinged, independently, to the frame of the lawn mower, and a lower portion of the front end of the front hanger 1 and a lower portion of the rear end of the rear hanger 2 being hinged, independently to a top portion of the mower deck 16. A first link 3 is hinged to a middle portion of the rear link of the four link frame of the rear hanger 2, and an upper end of the first link 3 is linked to an lower end of a bridging swing arm 4, with a middle portion of the bridging swing arm 4 being hinged to the frame of the lawn mower via a spindle 5. An upper end of the bridging swing arm 4 is hinged to a rear end of a second link 6, and a front end of the second link 6 is hinged to an upper end of a swing arm 7, with an lower end of which being connected to the rotatable axle 8 and able to rotate with respect to the rotatable axle. One end of the rotatable axle 8 is connected with a driving lever 9, with an upper end of the driving lever 9 being in screw connection with a fine adjustment screw 10. An end of the fine adjustment screw 10 opposite a head thereof extends rearward and against a middle portion of the swing arm 7. The other end of the rotatable axle 8 is connected with a handle 11 which can be operated to drive the rotatable axle 8 to rotate.

When the handle 11 is pushed forward, the rotatable axle 8 rotates in the clockwise direction, which causes the driving lever 9 to rotate in the clockwise direction. The end of the fine adjustment screw 10 opposite a head thereof pushes the upper end of the swing arm 7 to rotate rearward, and the swing arm 7 forces the bridging swing arm 4 rotate in the clockwise direction via the second link 6. Then, the bridging swing arm 4 forces the first link 3 to swing upward, and the first link 3 forces the rear end of the rear hanger 2 to swing upward, thereby raising the mower deck 16. In contrast, when the handle 11 is pulled rearward, the mower deck 16 will be lowered.

The height of the mower deck 16 can be fine adjusted by manually rotate the fine adjustment screw 10 to move the screw back and forth. The position of the end of the fine adjustment screw 10 opposite a head thereof which pushes the upper end of the swing arm 7 will determine the position limit to which the upper end of the swing arm can swing forward, and in turn determine the mowing height of the mower deck 16. The rearward movement of the swing arm 7 will not be limited. When the ground surface is not flat and a little hillock is present, upon contact of a support wheel 18 with the little hillock, the mower deck 16 as a whole can be lifted and avoid collision therewith, thereby avoiding damage of the lawn and impact on the mechanical structure.

The upper end of the handle 11 is extended outside of a slot 14a at the top of a handle adjuster frame 14, and one side of the slot 14a is provided with a plurality of locking slots 14b in which the handle 11 can be locked. The handle adjuster frame 14 is provided with an adjuster cover 15. As such, the handle 11 is able to swing forward and backward in the slot 14a, and when the mower deck 16 is adjusted to a desirable height, the handle 11 can be swung to, and locked in a respective locking slot 14b such that the height of the mower deck can be maintained.

An lower end of the handle 11 is connected, preferably welded, with a handle sleeve tube 11a, and the central axis of the handle sleeve tube 11a is substantially perpendicular to the central axis of the rotatable axle 8. Within the handle sleeve tube 11a, a handle axle 12 is inserted, and the two ends of the handle axle 12 are fixedly connected, respectively, to the upper ends of two brackets 8a the lower ends of which are connected to the rotatable axle 8. Rotation of the handle sleeve tube 11a with respect to the handle axle 12 will drive the handle 11 to swing to the left or the right so that the handle can enter or withdraw from the locking slots 14b freely. Swing back and forth of the handle 11 will drive the rotate axle 8 to rotate via the handle sleeve tube 11a and the brackets 8a connected to the rotate axle 8, such that the height of the mower deck 16 can be adjusted.

On the handle axle 12, a torsion spring 13 is mounted. The torsion spring 13 functions to push the handle 11 to the bottom of a locking slot 14b. The tension of the torsion spring 13 forces the handle 11 to be locked reliably in the locking slot 14b, thereby avoiding release of the handle 11 from the locking slot 14b.

The end of the rotatable axle 8 near the handle 11 is supported within an axle hole in a vertical wall of the handle adjuster frame 14. A side wall of the swing arm 7 may be connected with a swing arm stop plate 7a, and the end of the fine adjustment screw 10 opposite a head thereof sits against the swing arm stop plate 7a. Preferably, a holding portion at the upper end of the handle 11 is provided with a handle cover 11b.

The technical features related to the present invention which are not described in detail in this disclosure are already well known to one skilled in the art, and thus will not be described further for brevity.

The embodiments described above are merely preferred ones for carrying out the present invention, and they are not intended to limit the scope of the present invention. The present invention may also be implemented in other embodiments. Therefore, substitutions, modifications, alterations or changes which are equivalent to the embodiments described herein are within the scope of the present invention.

What is claimed is:

1. A raising and lowering mechanism for a mower deck of a lawn mower, comprising: a frame and a mower deck hanging from the frame, wherein the raising and lowering mechanism further comprises a front hanger and a rear hanger; the front hanger and the rear hanger each are, independently, a four link frame, with a front end of the front hanger and a front end of the rear hanger being hinged, independently, to the frame of the lawn mower, and a lower portion of a rear end of the front hanger and a lower portion of a rear end of the rear hanger being hinged, independently, to a top portion of the mower deck; a first link is hinged to a middle portion of a rear link of the four link frame of the rear hanger, and an upper end of the first link is linked to an lower end of a bridging swing arm, with a middle portion of the bridging swing arm being hinged to the frame of the lawn mower via a spindle; an upper end of the bridging swing arm is hinged to a rear end of a second link, and a front end of the second link is hinged to an upper end of a swing arm, with an lower end of the swing arm being connected to a rotatable axle and able to rotate with respect to the rotatable axle; one end of the rotatable axle is connected with a driving lever, with an upper end of the driving lever being in screw connection with a fine adjustment screw; an end of the fine adjustment screw opposite a head thereof extends rearward and against a middle portion of the swing arm; the other end of the rotatable axle is connected with a handle which is operable to drive the rotatable axle to rotate.

2. The raising and lowering mechanism for a mower deck of a lawn mower according to claim 1, wherein an upper end of the handle is extended outside of a slot at a top of a handle adjuster frame, and one side of the slot is provided with a plurality of locking slots in which the handle can be locked.

3. The raising and lowering mechanism for a mower deck of a lawn mower according to claim 2, wherein an lower end of the handle is welded with a handle sleeve tube, and a central axis of the handle sleeve tube is substantially perpendicular to a central axis of the rotatable axle; within the handle sleeve tube, a handle axle is inserted, and two ends of the handle axle are fixedly connected, respectively, to upper ends of two brackets, and lower ends of the brackets are connected to the rotatable axle.

4. The raising and lowering mechanism for a mower deck of a lawn mower according to claim 3, wherein a torsion spring is mounted onto the handle axle and the torsion spring functions to push the handle to a bottom of the locking slot.

5. The raising and lowering mechanism for a mower deck of a lawn mower according to claim 2, wherein an end of the rotatable axle near the handle is supported within an axle hole in a vertical wall of the handle adjuster frame.

6. The raising and lowering mechanism for a mower deck of a lawn mower according to claim 1, wherein a side wall of the swing arm is connected with a swing arm stop plate, and the end of the fine adjustment screw opposite a head thereof sits against the swing arm stop plate.

7. The raising and lowering mechanism for a mower deck of a lawn mower according to claim 2, wherein a side wall of the swing arm is connected with a swing arm stop plate, and the end of the fine adjustment screw opposite a head thereof sits against the swing arm stop plate.

8. The raising and lowering mechanism for a mower deck of a lawn mower according to claim 3, wherein a side wall of the swing arm is connected with a swing arm stop plate, and the end of the fine adjustment screw opposite a head thereof sits against the swing arm stop plate.

9. The raising and lowering mechanism for a mower deck of a lawn mower according to claim 4, wherein a side wall of the swing arm is connected with a swing arm stop plate, and the end of the fine adjustment screw opposite a head thereof sits against the swing arm stop plate.

10. The raising and lowering mechanism for a mower deck of a lawn mower according to claim 5, wherein a side wall of the swing arm is connected with a swing arm stop plate, and the end of the fine adjustment screw opposite a head thereof sits against the swing arm stop plate.

11. The raising and lowering mechanism for a mower deck of a lawn mower according to claim 5, wherein a holding portion at an upper end of the handle is provided with a handle cover.

* * * * *